(12) United States Patent
Takasu et al.

(10) Patent No.: US 9,852,413 B2
(45) Date of Patent: Dec. 26, 2017

(54) POS SYSTEM AND PRINTING DEVICE (71) Applicant: Seiko Epson Corporation, Tokyo (JP)

(72) Inventors: Kazuhiro Takasu, Shiojiri (JP); Koichiro Tsutsumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/441,405

(22) PCT Filed: Nov. 11, 2013

(86) PCT No.: PCT/JP2013/006623
§ 371 (c)(1),
(2) Date: May 7, 2015

(87) PCT Pub. No.: WO2014/076930
PCT Pub. Date: May 22, 2014

(65) Prior Publication Data
US 2015/0287012 A1 Oct. 8, 2015

(30) Foreign Application Priority Data

Nov. 19, 2012 (JP) ................................ 2012-252963

(51) Int. Cl.
*G06Q 20/00* (2012.01)
*G06Q 20/20* (2012.01)
(Continued)

(52) U.S. Cl.
CPC ......... *G06Q 20/209* (2013.01); *G06Q 20/202* (2013.01); *G06Q 20/208* (2013.01); *G07G 1/0018* (2013.01); *G07G 1/14* (2013.01)

(58) Field of Classification Search
CPC ........................... G06Q 20/20; G06Q 30/0603
(Continued)

(56) References Cited

U.S. PATENT DOCUMENTS

2012/0050795 A1* 3/2012 Nakamura ............ G06F 3/1207
358/1.15
2012/0059692 A1 3/2012 Nemoto
(Continued)

FOREIGN PATENT DOCUMENTS

| CN | 102385781 A | 3/2012 |
|----|-------------|--------|
| JP | 05-073769 A | 3/1993 |

(Continued)

OTHER PUBLICATIONS

Takahisa, N., "Automatic Recognition in Mobile Environment & Cloud Environment", Employment of Smart Devices for Business Systems, Development of systems which enable use of peripheral devices for distribution operations from smartphones. Apr. 10, 2012, pp. 23-25.

*Primary Examiner* — Rokib Masud
(74) *Attorney, Agent, or Firm* — Foley & Lardner LLP (57) ABSTRACT

Terminals connected to a POS terminal can execute appropriate processes using functions of a browser. A POS system 1 has a first tablet terminal 101 that runs a browser; a second tablet terminal 102 that runs a browser; and a POS control device 11 that is communicatively connected to the first tablet terminal 101 and the second tablet terminal 102, and has a communication unit 20b that sends data received from the browser running on the first tablet terminal 101 to the browser running on the second tablet terminal 102.

5 Claims, 6 Drawing Sheets (51) Int. Cl.
*G07G 1/00* (2006.01)
*G07G 1/14* (2006.01)

(58) Field of Classification Search
USPC .................................. 705/26.41, 21, 41, 39
See application file for complete search history.

(56) References Cited

U.S. PATENT DOCUMENTS

2012/0095853 A1* 4/2012 von Bose ............... G06Q 20/20
 705/16
2015/0088677 A1* 3/2015 Reed .................... G07G 1/0036
 705/23

FOREIGN PATENT DOCUMENTS

| | | |
|---|---|---|
| JP | 10-055332 A | 2/1998 |
| JP | 11-144146 A | 5/1999 |
| JP | 2004-164195 A | 6/2004 |

\* cited by examiner

POS SYSTEM AND PRINTING DEVICE

TECHNICAL FIELD

The present invention relates to a POS system that includes a first terminal, a second terminal, and a POS control terminal, and to a printing device that prints.

BACKGROUND

POS systems that have a POS control device (POS server) and terminals (POS controllers) connected to the POS control device, and execute processes including printing images by the cooperation of these devices are known from the literature (see, for example, PTL 1).

CITATION LIST

Patent Literature

[PTL 1] JP-A-H05-73769

SUMMARY OF INVENTION

Technical Problem

In the POS system disclosed in PTL 1, a dedicated application for controlling the POS control device is not installed on the terminal, and the terminal accesses a specific server through a browser as needed to control the POS control device through functions of the browser. The value of the system can be further enhanced and installation of this type of POS system can be promoted if functions of the terminal browser can be used to execute the appropriate processes.

The present invention was conceived with consideration for the foregoing problem, and an object of the invention is to enable each terminal connected to the POS control device to execute appropriate processes through functions of a browser.

Solution to Problem

To achieve the foregoing object, a POS system according to the invention comprises a first terminal having a first control unit that runs a browser, and a transmission unit that transmits data from the browser; a POS control device having a communication unit that connects to the transmission unit of the first terminal, receives data sent from the transmission unit, and transmits the received data; and a second terminal having a reception unit that connects to the communication unit of the POS control device and receives the data transmitted from the communication unit, and a second control unit that runs a browser that processes the data received by the reception unit, and a display unit that displays a browser controlled by the second control unit.

The invention thus comprised can send data from a first terminal through a POS control device to a second terminal, and can cause the second terminal to present displays on the display unit based on the data. More specifically, appropriate processes can be executed using functions of the browsers of the first terminal and the second terminal.

The invention is further characterized by the data transmitted from the transmission unit of the first terminal being display data that is displayed by a browser running on the second terminal; the first terminal having a data processing unit that generates the display data; and the second control unit of the second terminal displaying the display data generated by the data processing unit of the first terminal on the display unit.

The invention thus comprised can send display data from a first terminal through a POS control device to the second terminal, and cause the second terminal to display images based on the display data. More specifically, appropriate processes can be executed using functions of the browsers of the first terminal and the second terminal.

The invention is further characterized by comprising: an input device that is connected to the POS control device and inputs data; the communication unit of the POS control device transmitting the input data input by the input device to the first terminal; and the data processing unit generating the display data based on the transmitted input data.

A barcode scanner and other types of input devices related to POS transactions can be connected to the POS control device. When input data from an input device is input to the POS control device in this configuration of the invention, the input data is sent to the first terminal, and the first terminal generates display data based on the input data. As a result, by sending the generated display data through the POS control device to the second terminal, the first terminal can cause the second terminal to display appropriate images corresponding to the input from the input device. More specifically, appropriate processes can be executed using functions of the browsers of the first terminal and the second terminal.

The invention is further characterized by the input device being a barcode scanner that reads barcodes, or a card reader that reads card information.

The invention thus comprised can cause the second terminal to display appropriate images corresponding to the input from the input device whether a barcode scanner related to POS transactions or a card reader is connected to the POS terminal.

The invention is further characterized by the POS control device also having a print unit that prints based on the data transmitted from the transmission unit of the first terminal.

The invention thus comprised can send data from a browser running on the first terminal to a browser running on the second terminal using a POS control device having a function for printing under the control of the first terminal.

To achieve the foregoing object, another aspect of the invention is printing device comprising: a communication unit that receives data transmitted from a first terminal that runs a browser, and sends the received data to a second terminal that runs a browser; and a print unit that prints based on the data transmitted from the first terminal.

The invention thus comprised can use a printing device with a function for printing to send data from a browser running on the first terminal to a browser running on the second terminal.

DESCRIPTION OF EMBODIMENTS

A preferred embodiment of the invention is described below with reference to the accompanying figures.

Figure 1:
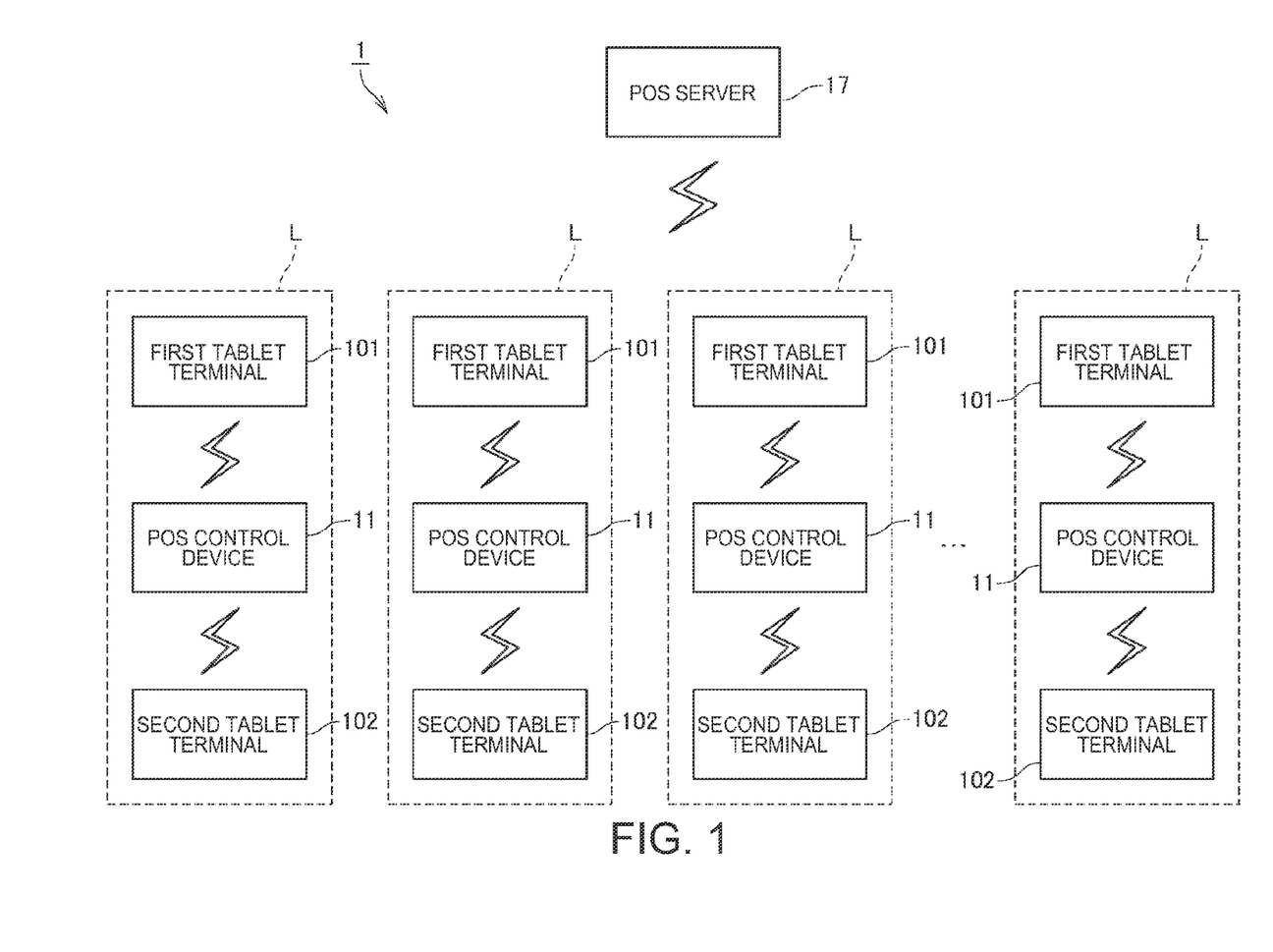
FIG. 1 is a block diagram illustrating the configuration of a POS system according to an embodiment of the invention.
Figure 2:
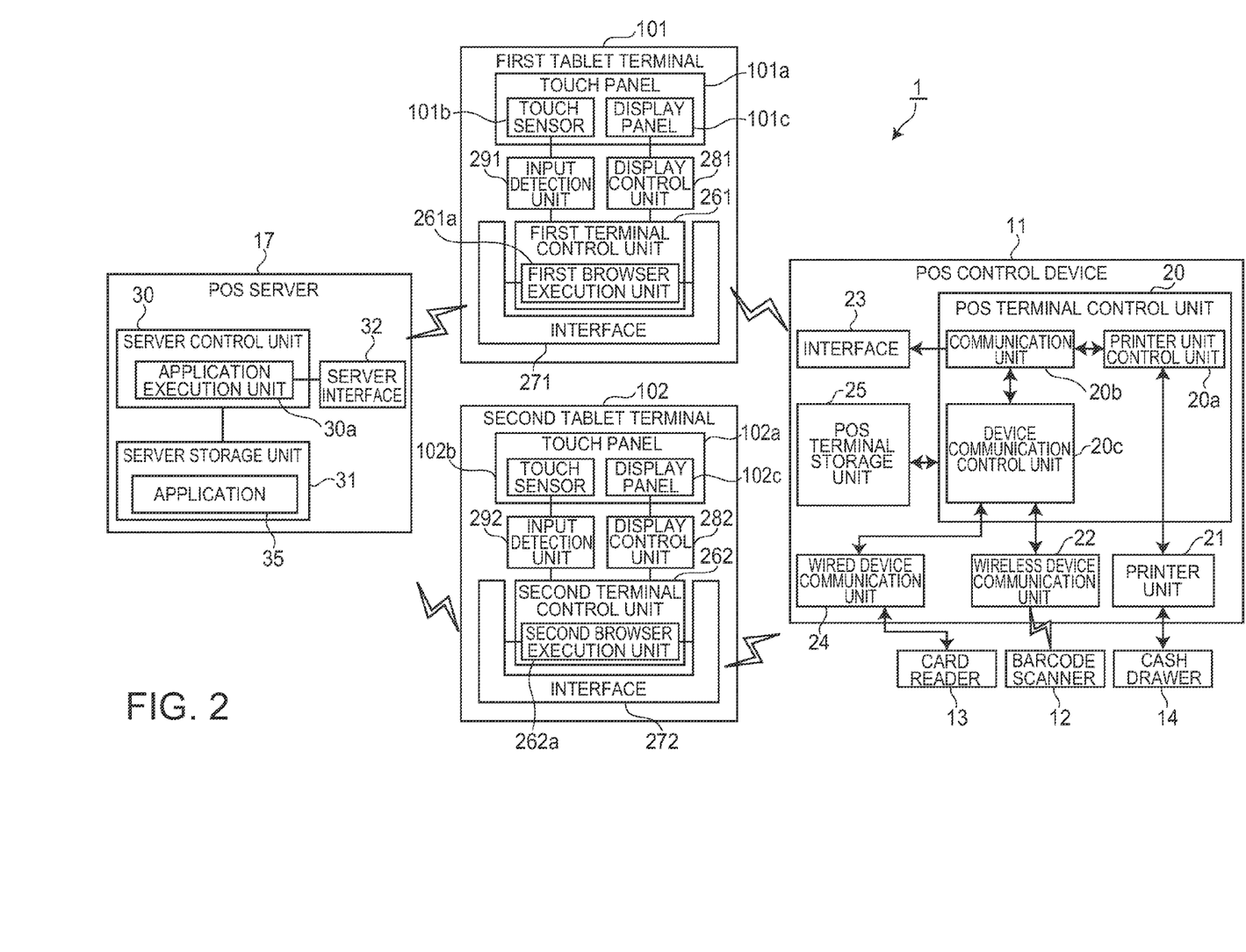
FIG. 2 is a block diagram showing the functional configuration of devices in the POS system.

FIG. 1 is a block diagram illustrating the basic configuration of a POS (point-of-sale) system 1 according to this embodiment of the invention. FIG. 2 is a block diagram illustrating the functional configuration of a first tablet terminal 101 (first terminal), a second tablet terminal 102 (second terminal), a POS control device 11 (printing device), and a POS server 17 in the POS system 1.

The POS system 1 is a system that is employed in shopping centers, department stores, convenience stores, and other types of retail stores, restaurants, coffee shops, and other food service providers, and other types of stores and businesses. Functions of the POS system 1 include functions for managing product sales, product inventory, and sales trends in a store; functions for processing transactions for products purchased by customers at checkout counters in a store; functions related to issuing receipts for payments received from customers; and functions for providing transaction-related information to customers.

There are plural checkout counters L where transactions are processed in a store where the POS system 1 is employed. At least one POS control device 11 is disposed, and two terminals, a first tablet terminal 101 and a second tablet terminal 102, can be connected to the POS control device 11, at one checkout counter L.

Figure 4:
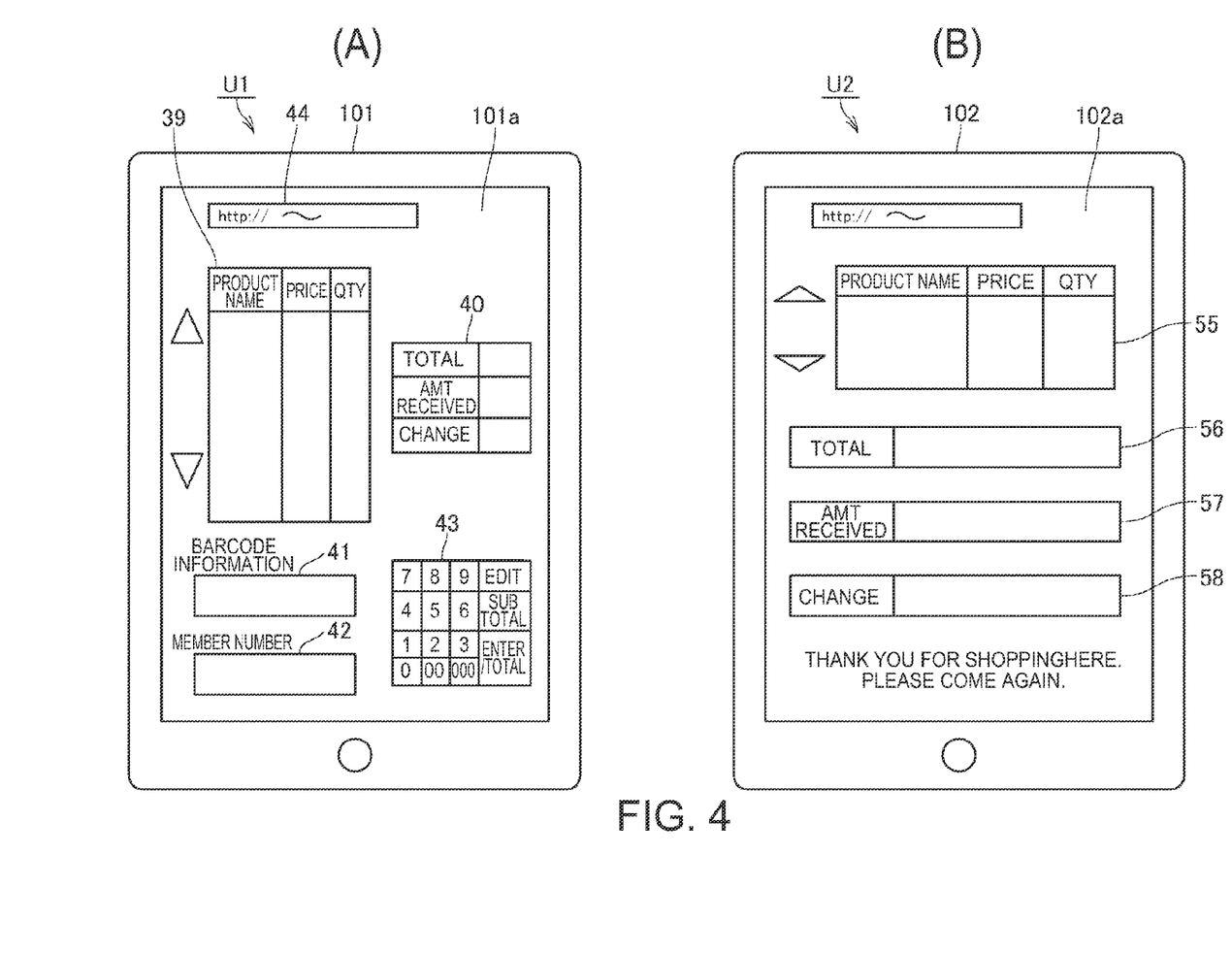
FIG. 4 shows user interfaces displayed on the tablet terminals.

The first tablet terminal 101 and the second tablet terminal 102 are tablet computers, and in this embodiment as further described below with reference to FIG. 4 are terminals with a touch panel disposed to the display area formed on the front of the tablet enabling input by touch operations.

The first tablet terminal 101 is a tablet used by the checkout clerk that processes transactions at the checkout counter L, and provides an appropriate user interface to the checkout clerk when processing transactions at the checkout counter L as described further below.

The second tablet terminal 102 is a terminal with a function for displaying transaction-related information, such as the total amount of the transaction, for a customer at the checkout counter L. More specifically, the second tablet terminal 102 is a terminal that functions as a so-called customer display. Dot matrix display panels with a resolution of several ten by several hundred dots are commonly used as customer displays at the point of sale, but the POS system 1 according to this embodiment enables using a general purpose tablet computer as the customer display as further described below, and displays extremely high resolution, dynamic images compared with the customer displays according to the related art. The second tablet terminal 102 is disposed to an appropriate location where it can be seen by the customer at the checkout counter L.

The POS control device 11 is a printer with at least the ability to produce receipts.

As shown in FIG. 2, a barcode scanner 12 (input device) that reads barcodes from products or product packaging, a card reader 13 (input device) that reads credit cards and loyalty cards, for example, and a cash drawer 14 that holds paper currency, coins, checks and gift certificates, for example, are connected to the POS control device 11. The card reader 13 may be a device that reads magnetic information from magnetic stripe cards, or a device that reads and writes to IC cards. The barcode scanner 12 connects to the POS control device 11 by a near-field communication standard such as Bluetooth (T). The card reader 13 connects to the POS control device 11 through a wired communication interface such as USB. The cash drawer 14 connects to the POS control device 11 by a wired communication interface conforming to a specific serial communication standard.

The POS control device 11 includes a POS terminal control unit 20, a printer unit 21 (print unit), a wireless device communication unit 22, a wired device communication unit 24, an interface 23 (interface), and a POS terminal storage unit 25.

The POS terminal control unit 20 controls parts of the POS control device 11, and includes a CPU, ROM, RAM, and other peripheral circuits. The POS terminal control unit 20 includes a printer unit control unit 20a that runs programs related to controlling the printer unit 21 (described below), a communication unit 20b that runs a program related to communication control and controls communication between the first tablet terminal 101 and the second tablet terminal 102, and a device communication control unit 20c that runs a program related to device control, communicates with the devices, and controls the devices. As described further below, the communication unit 20b is connected to the transmission unit (first terminal control unit 261 and terminal interface 271) of the first tablet terminal 101 (first terminal) and has a function for receiving data sent from the transmission unit, and is connected to the reception unit (second terminal control unit 262 and terminal interface 272) of the second tablet terminal 102 (second terminal) and has a function for sending data received from the first tablet terminal 101 to the reception unit. The program related to controlling the printer unit 21 described above, the program related to controlling communication, and the program related to device control are produced using a dedicated API (application program interface) provided by the manufacturer of the POS control device 11, for example.

The printer unit 21 includes a conveyance mechanism that conveys roll paper, a print mechanism that prints text and images on roll paper with a thermal head, and a cutter mechanism that cuts the roll paper, and produces receipts by printing images related to the receipt on the roll paper and then cutting the roll paper at a specific position as controlled by the printer unit control unit 20a. The cash drawer 14 is connected to the POS control device 11 to communicate according to a specific serial communication protocol. The printer unit 21 appropriately controls the cash drawer 14 to open the drawer disposed to the cash drawer 14, for example, as controlled by the printer unit control unit 20a.

The wireless device communication unit 22 communicates wirelessly with the barcode scanner 12 using a near-field communication standard such as Bluetooth (T), and includes a relation manager, a relation controller, a high frequency circuit, and an antenna. The device communication control unit 20c, which is one function block of the POS terminal control unit 20, controls the wireless device communication unit 22 and communicates with the barcode scanner 12 by near-field communication using the Bluetooth standard by reading and running a Bluetooth Driver Stack to control Bluetooth hardware.

The wired device communication unit 24 has a network interface card, for example, connected to a physical port and communicates with the card reader 13 according to a specific communication protocol such as USB. The device communication control unit 20c, which is one function block of the POS terminal control unit 20, controls the wired device communication unit 24, and exchanges data and signals with the card reader 13.

The interface 23 includes a communication interface such as a specific network card, and sends and receives data according to a specific wireless communication standard with the first tablet terminal 101 and the second tablet terminal 102 as controlled by the communication unit 20b.

The POS terminal storage unit 25 includes a nonvolatile memory such as EEPROM, and nonvolatilely stores data rewritably.

The first tablet terminal 101 includes a first terminal control unit 261 (first control unit), a terminal interface 271, a display control unit 281, an input detection unit 291, and a touch panel 101a.

The touch panel 101a includes a display panel 101c disposed to the front of the first tablet terminal 101, and a touch sensor 101b integrally disposed on the surface of the display panel 101c. The display panel 101c may be an LCD panel, an OLED panel, e-paper, or other type of display, and is driven by the display control unit 281. The touch sensor 101b is a capacitive or pressure-sensitive sensor, detects touch operations by the user's finger, stylus, or similar device, and inputs a signal indicating the position where the operation was detected to the input detection unit 291.

The display control unit 281 drives the display panel 101c based on display data input from the first browser execution unit 261a described below, and displays a window containing text or images on the display panel 101c.

The input detection unit 291 detects touch operations on the touch panel 101a based on the signals output by the touch sensor 101b. When an operation is detected, the input detection unit 291 generates coordinate data expressing the position of the detected operation in coordinates corresponding to the display position on the display panel 101c, and outputs to the first browser execution unit 261a.

The first terminal control unit 261 controls the parts of the first tablet terminal 101, and includes a CPU, ROM, RAM, and other peripheral circuits. The first terminal control unit 261 includes a first browser execution unit 261a that renders browser functions by running a browser program. The first browser execution unit 261a functions as a web browser by running the browser program.

The first browser execution unit 261a downloads a web page written in HTML or other markup language or scripting language from the POS server 17 using a function of a web browser. The downloaded web page data is stored in RAM not shown, for example. The first browser execution unit 261a reads the downloaded web page data, generates display data for displaying the web page, and outputs to the display control unit 281 by functions of the web browser. The first browser execution unit 261a independently or in conjunction with the application execution unit 30a (described below) of the POS server 17 executes processes by functions of the scripts embedded in the web page.

When a touch operation on the touch sensor 101b is detected by the input detection unit 291, the first browser execution unit 261a determines the input content based on the coordinate data input by the input detection unit 291 according to the touch operation, and the display image data output to the display control unit 281. Based on the appropriately identified input content, the first browser execution unit 261a executes an appropriate process by a script function, and outputs data indicating the identified input content to the POS server 17. The application execution unit 30a executes processes based on the input data. The first browser execution unit 261a receives data resulting from the application execution unit 30a running an application program from the POS server 17, generates display data reflecting the received data, and outputs to the display control unit 281.

The terminal interface 271 communicates with the POS control device 11 and the POS server 17 according to a specific wireless communication standard as controlled by the first terminal control unit 261. In this embodiment of the invention, the terminal interface 271 and the first terminal control unit 261 work together and function as a transmission unit that transmits data from a browser.

Like the first tablet terminal 101, the second tablet terminal 102 includes a second terminal control unit 262 (second control unit), a terminal interface 272, a display control unit 282, an input detection unit 292, and a touch panel 102a (display unit). The configuration of the second tablet terminal 102 is identical to that of the first tablet terminal 101, and further detailed description thereof is omitted.

The terminal interface 272 and second terminal control unit 262 work together and function as a reception unit that receives data sent from the communication unit 20b of the POS control device 11.

The touch panel 102a functions as a display unit that displays a browser controlled by the second terminal control unit 262 (second control unit).

Below, the first tablet terminal 101 and second tablet terminal 102 are generically referred to appropriately as terminals.

The POS server 17 includes a server storage unit 31 that stores a database storing product-related information, a database for managing sales, and a database for managing inventory, and uses these databases to manage the POS system 1.

The POS server 17 also has a server control unit 30, a server storage unit 31, and a server interface 32.

The server control unit 30 controls parts of the POS server 17, and includes a CPU, ROM, RAM, and other peripheral circuits. The server storage unit 31 includes a nonvolatile storage device such as a hard disk or EEPROM or other nonvolatile memory, and stores data rewritably. The server interface 32 communicates wirelessly according to a specific standard with the first tablet terminal 101 and second tablet terminal 102 as controlled by the server control unit 30.

An application 35 is stored in the server storage unit 31 so that the application 35 can be loaded. The application execution unit 30a of the server control unit 30 executes processes alone or in conjunction with the first browser execution unit 261a of the first terminal control unit 261 of the first tablet terminal 101 by reading and running the application 35.

The application execution unit 30a generates, or reads from the server storage unit 31, the data for the web page requested by the first tablet terminal 101 or the second tablet terminal 102, and sends the data to the terminal that sent the request. The terminals display screens as described below based on the received web page data.

Figure 3:
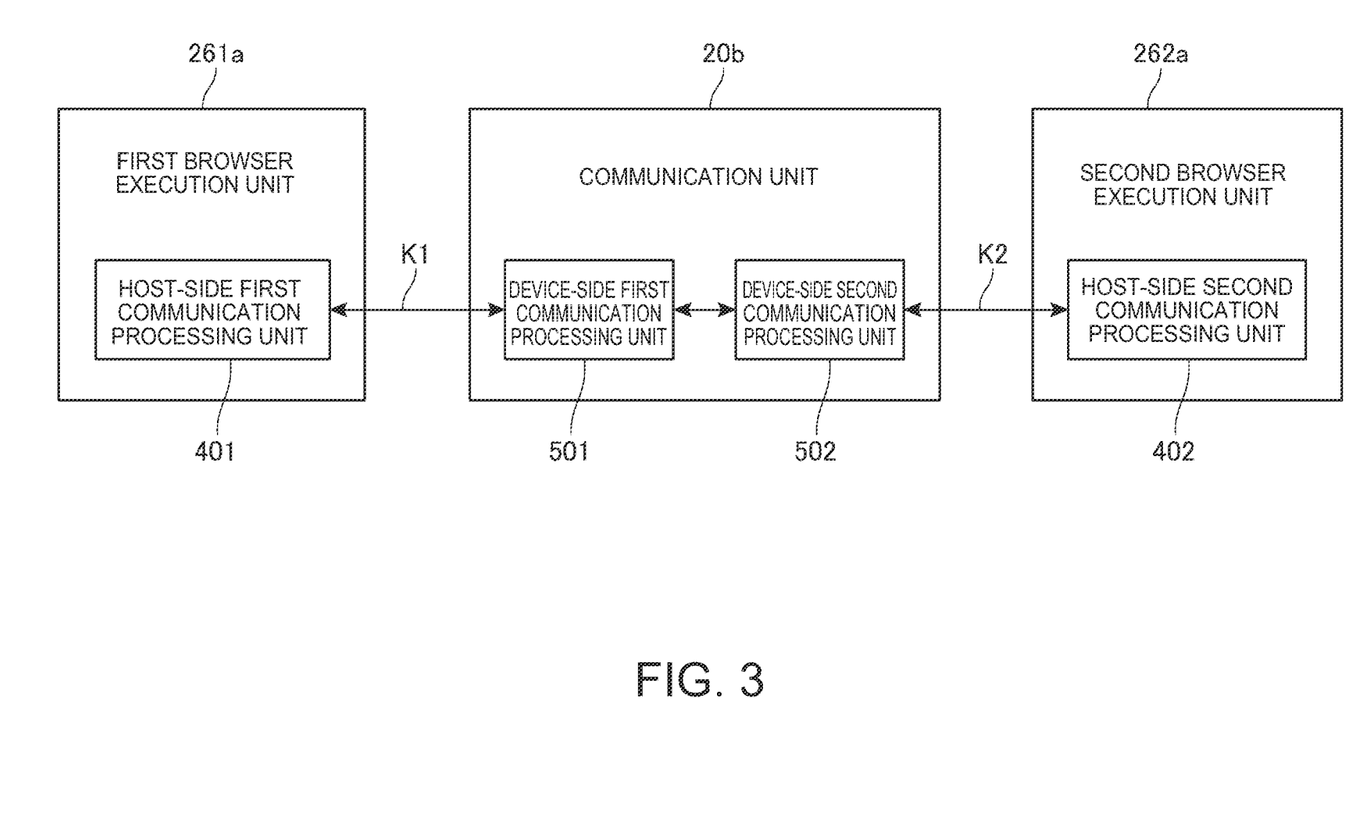
FIG. 3 is a block diagram showing the functional configuration of essential parts of the POS system.

FIG. 3 illustrates in a format appropriate for description the relationship between the communication unit 20b of the POS terminal control unit 20 of the POS control device 11, the first browser execution unit 261a of the first terminal control unit 261 of the first tablet terminal 101, and the second browser execution unit 262a of the second terminal control unit 262 of the second tablet terminal 102.

As described further below, this embodiment of the invention is configured to enable sending data from the first browser execution unit 261a to the second browser execution unit 262a through the communication unit 20b. FIG. 3 illustrates the function blocks that send data from the first browser execution unit 261a to the second browser execution unit 262a. Note that the data communicated between the browser execution units in this embodiment is more specifically display-related data D1 (display data), and the specific format of this data is further described in detail below.

As shown in FIG. 3, to communicate, a first path K1, which is a logical communication path for sending and receiving data (display-related data D1), is first established between the host-side first communication processing unit 401 of the first browser execution unit 261a, and the device-side first communication processing unit 501 of the communication unit 20b. More specifically, the host-side first communication processing unit 401 and the device-side first communication processing unit 501 open a connection conforming to the WebSocket standard. Note that the host-side first communication processing unit 401 and the device-side first communication processing unit 501 are both function blocks related to a software interface for sending and receiving data according to the WebSocket standard. In this embodiment of the invention, the first path K1 is a communication path conforming to the WebSocket standard, but a different standard, such as Comet, may be used.

Likewise, to communicate, a second path K2, which is a logical communication path for sending and receiving data (display-related data D1), is opened between the host-side second communication processing unit 402 of the second browser execution unit 262a, and the device-side second communication processing unit 502 of the communication unit 20b. Like the first path K1, this second path K2 is a logical communication path based on a connection established according to the WebSocket standard.

To send data to the second browser execution unit 262a, the first browser execution unit 261a controls the host-side first communication processing unit 401 to output the data through the first path K1 to the device-side first communication processing unit 501.

When data is input through the first path K1 to the device-side first communication processing unit 501, the communication unit 20b outputs the input data to the device-side second communication processing unit 502, and causes the device-side second communication processing unit 502 to output the data through the second path K2 to the host-side second communication processing unit 402.

Data is thus sent from the first browser execution unit 261a through the communication unit 20b to the second browser execution unit 262a.

The basic operation when devices of the POS system 1 cooperate to execute a transaction-related process is described next.

As described above, the POS system 1 according to this embodiment uses a general purpose tablet computer as the customer display, and displays extremely high resolution, dynamic images compared with the customer displays according to the related art . This is achieved by the operation described below.

The first tablet terminal 101 and second tablet terminal 102 first execute the following processes before running the transaction-related process.

The first tablet terminal 101 is described first.

Specifically, the checkout clerk or other worker first starts the browser of the first tablet terminal 101, and commands displaying the first user interface U1 on the touch panel 101a. Based on this command, the first browser execution unit 261a of the first terminal control unit 261 accesses a specific address on the POS server 17, acquires the web page data from an HTML file, for example, and displays the first user interface U1 based on the acquired data. Embedded in this web page data is a program written in a specific scripting language with the functions for executing the transaction-related process (described below) in conjunction with the application execution unit 30a of the POS server 17.

FIG. 4 (A) shows an example of the first user interface U1 presented on the touch panel 101a.

A list display area 39 where the names of the products purchased by the customer, the prices of the products, and the quantities of the products are presented in a list is displayed at the top left of the first user interface U1 in FIG. 4 (A). To the right of this list display area 39 is displayed an amount display area 40 where the total amount of the products purchased by the customer, the amount of money received from the customer, and the amount of change due to the customer are displayed.

Below the list display area 39 is a barcode information input field 41, which is an input field where the information (referred to below as barcode information) expressed by the barcode that is read by the barcode scanner 12 is input and displayed. The barcode information is basically identification information uniquely assigned to each type of product.

Below the barcode information input field 41 is a customer number input field 42 , which is an input field where the customer number acquired by reading a customer membership card with the card reader 13 is input and displayed when a card is read.

A virtual keypad 43 is displayed on the right side of the barcode information input field 41 and the customer number input field 42. Information can be input through the virtual keypad 43 to the various fields presented in the first user interface U1, and the virtual keypad 43 includes the keys required to input information.

An address input field 44 where the accessed address is displayed is presented at the top of the first user interface U1.

The second tablet terminal 102 is described next. As described above, the second tablet terminal 102 is a terminal that functions as a customer display to provide transaction-related information to the customer.

The checkout clerk or other worker first starts the browser of the second tablet terminal 102, and commands displaying the second user interface U2 on the touch panel 102a. Based on this command, the second browser execution unit 262a of the second terminal control unit 262 accesses a specific address on the POS server 17, acquires the web page data from an HTML file, for example, and displays the second user interface U2 based on the acquired data.

FIG. 4 (B) shows an example of the second user interface U2 displayed on the touch panel 102a.

A purchased product display area 55 where the names of the products purchased by the customer, the prices of the products, and the quantities of the products are presented in a list is displayed at the top part of the second user interface U2 in FIG. 4 (B). Below this purchased product display area 55 is a transaction total display area 56 where the total amount of the products purchased by the customer is displayed, therebelow is an amount-received display area 57 where the amount of money received from the customer for the transaction is displayed, and therebelow is a change-due display area 58 where the amount of change to be given to the customer is displayed.

Figure 5:
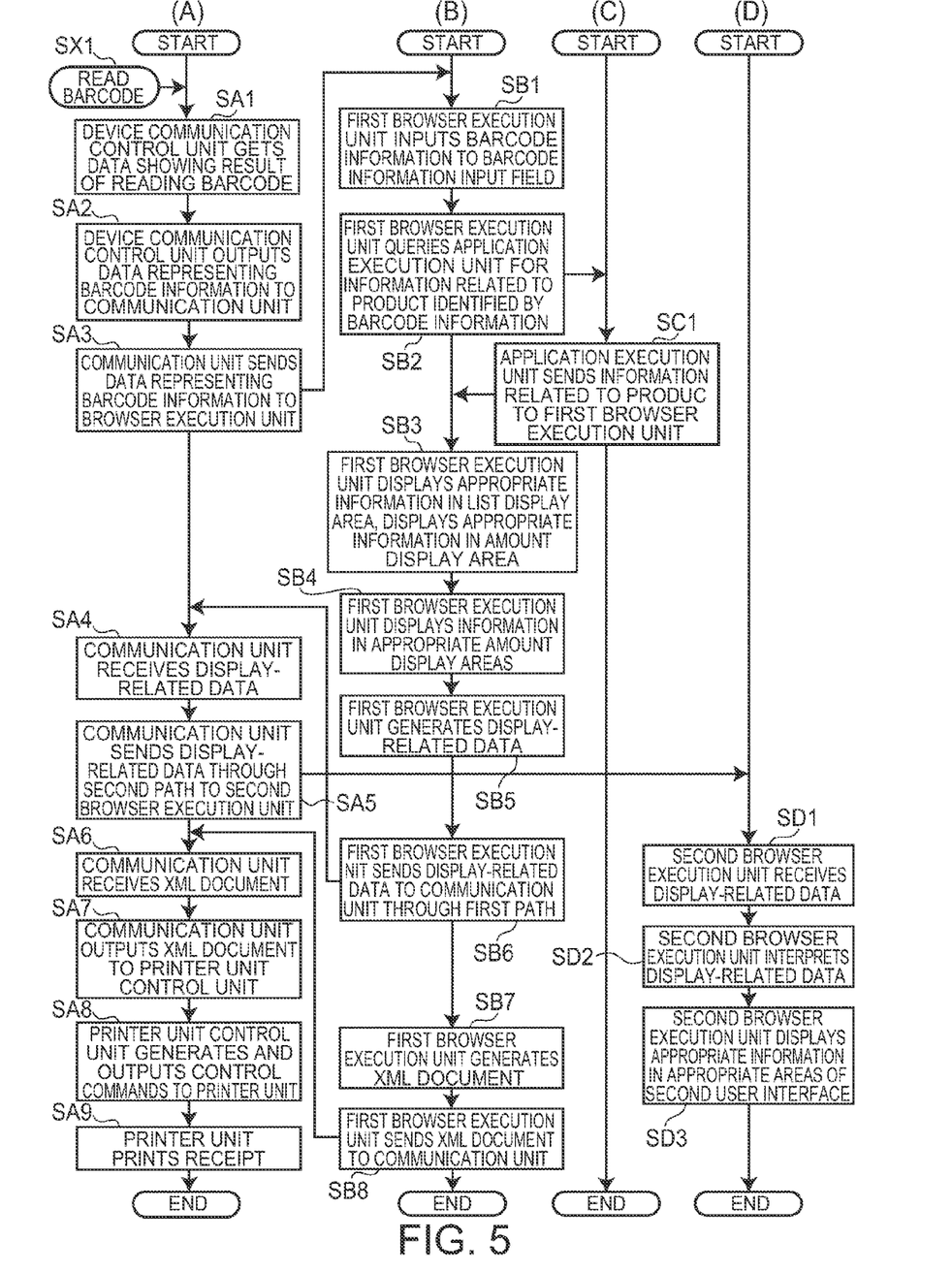
FIG. 5 is a flow chart showing the operation of devices in the POS system.

The operation of the devices in the POS system 1 configured as described above when cooperatively executing the transaction-related process is described below with reference to the flow chart in FIG. 5 using the operation when a customer purchases one product as an example. In FIG. 5, (A) shows the operation of the POS control device 11, (B) shows the operation of the first tablet terminal 101, (C)

shows the operation of the POS server 17, and (D) shows the operation of the second tablet terminal 102.

At the checkout counter, the checkout clerk scans the barcode on the one product purchased by the customer using the barcode scanner 12 (step SX1).

The device communication control unit 20c of the POS terminal control unit 20 acquires data showing the result of reading by the barcode scanner 12 through the wireless device communication unit 22 (step SA1). Based on the data showing the read result, the device communication control unit 20c also generates data (input data) indicating the barcode information, and outputs the data (input data) indicating the barcode information to the communication unit 20b (step SA2). The communication unit 20b sends the data (input data) indicating the barcode information to the first browser execution unit 261a of the first tablet terminal 101 according to a specific protocol (step SA3).

When the data (input data) indicating the barcode information is input, the first browser execution unit 261a of the first terminal control unit 261 of the first tablet terminal 101 inputs the barcode information to the barcode information input field 41 by a function of the program (referred to below as simply a "script") embedded in the HTML file related to the first user interface U1 (step SB1). Next, by a function of the script, the first browser execution unit 261a communicates with the application execution unit 30a of the POS server 17, and requests the product name and price of the product indicated by the barcode information (step SB2). The application execution unit 30a that received the request appropriately accesses the appropriate database by a function of the application 35, acquires the required information, and outputs the acquired information to the first browser execution unit 261a of the first tablet terminal 101 (step SC1).

The first browser execution unit 261a of the first tablet terminal 101 displays the name of the product the customer purchased, the price of the product, and the quantity of the product in the list display area 39, and displays the total amount of the product the customer purchased in the specific field of the amount display area 40, by a function of the script (step SB3).

Next, when an operation finalizing the purchase transaction is executed by the checkout clerk through the virtual keypad 43, payment is received from the customer and change is made, and the first browser execution unit 261a communicates appropriately with the application execution unit 30a using a function of the script, and displays the appropriate information in the appropriate fields of the amount display area 40 accordingly (step SB4).

Figure 6:
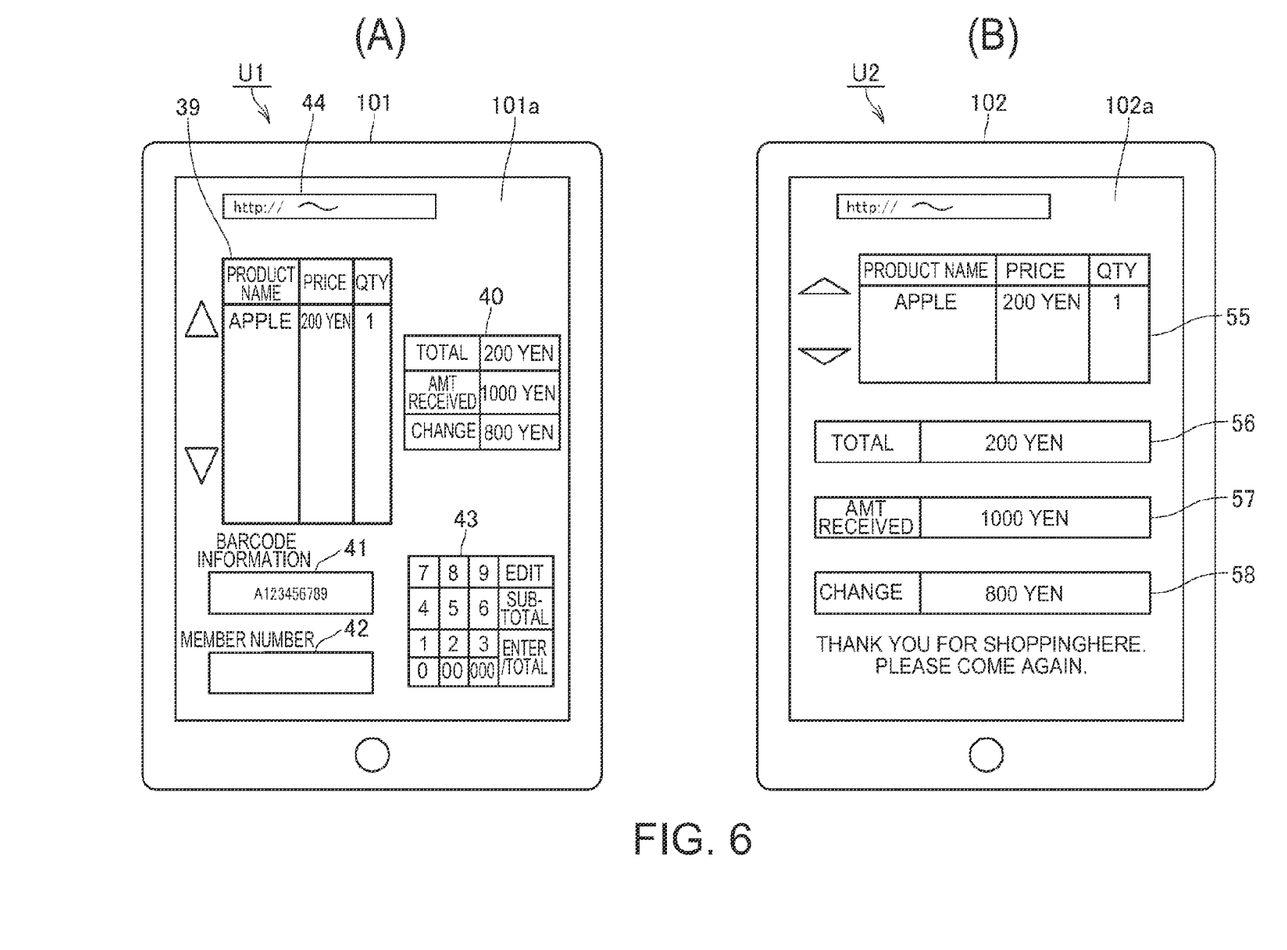
FIG. 6 shows user interfaces displayed on the tablet terminals.

FIG. 6 (A) shows an example of the first user interface U1 displayed when step SB4 is completed. As shown in FIG. 6 (A), when step SB4 is completed, the appropriate information is input and displayed in the respective areas formed in the first user interface U1 by a function of the first browser execution unit 261a (a function of the browser).

Next, the first browser execution unit 261a generates the display-related data D1 (display data) that displays information in the respective areas formed in the second user interface U2 by a script function (step SB5). In this event, the first browser execution unit 261a functions as a data processing unit that generates display data. The first browser execution unit 261a functioning as a data processing unit generates the display data (display-related data D1) based on the input data the POS control device 11 sent.

The display-related data D1 is data written in JSON (Java Script Object Notation), and is data specifying for each display area in the second user interface U2 the information to display in each area. More specifically, the display-related data D1 is display data that is displayed by the browser running on the second tablet terminal 102. When the second browser execution unit 262a receives the display-related data D1, the second browser execution unit 262a can display the information specified by the data in the respective areas of the second user interface U2 by a function of the script based on the received data.

More specifically, information indicating the product name, price, and quantity of the product the customer purchased is written according to protocol in the display-related data D1 as the information to be displayed in the purchased product display area 55 of the second user interface U2. Likewise, information indicating the total amount of the products the customer purchased is written as the information to display in the transaction total display area 56, information indicating the amount of money received from the customer for the transaction is written as the information to display in the amount-received display area 57, and information indicating the amount of change due to the customer is written as the information to display in the change-due display area 58, in the display-related data D1.

As known from the literature, data written in JSON is an appropriate format for data sent from the first browser execution unit 261a embodied by a function of the browser to the second browser execution unit 262a because it can be processed by a JavaScript (T) or other script embedded in the HTML file of the web page. A configuration that exchanges data in other formats is also conceivable.

Next, the first browser execution unit 261a sends the generated display-related data D1 through the first path K1 to the communication unit 20b of the POS control device 11 (step SB6). The method of sending data through the first path K1 is as described above.

When the communication unit 20b of the POS control device 11 receives the display-related data D1 (step SA4), it sends the received display-related data D1 through the second path K2 to the second browser execution unit 262a of the second tablet terminal 102 (step SA5).

When the second browser execution unit 262a of the second tablet terminal 102 receives the display-related data D1 (step SD1), it interprets the display-related data D1 written in JSON by a function of the script (step SD2), and displays the information specified by the received data in the appropriate areas of the second user interface U2 (step SD3). More specifically, the second terminal control unit 262 of the second tablet terminal 102 displays the display data (display-related data D1) generated by the first browser execution unit 261a functioning as the data processing unit of the first tablet terminal 101 on the touch panel 102a.

FIG. 6 (B) shows an example of the second user interface U2 when step SD3 is completed. As shown in FIG. 6 (B), the second browser execution unit 262a displays the appropriate information in the respective fields of the second user interface U2 based on the received display-related data D1. As a result, the customer doing the transaction can quickly and appropriately confirm the information related to the transaction by viewing the second user interface U2 presented on the touch panel 102a of the second tablet terminal 102. More specifically, unlike a dot matrix display panel with a resolution of several ten by several hundred dots according to the related art, the transaction-related information is displayed on the touch panel 102a of the second tablet terminal 102, which is a general purpose tablet computer. As a result, a large amount of information can be displayed by a high resolution, dynamic display means and thereby be provided to the customer.

Next, by a function of the script, the first browser execution unit 261a generates an XML document (data) containing information related to the receipt to be produced by the printer unit 21 (step SB7). Included in the XML document is the information required to produce a receipt, such as information about the text and images to be printed on the receipt, in an XML-compliant format.

Next, the first browser execution unit 261a sends the generated XML document to the communication unit 20b of the POS control device 11 according to a specific protocol (step SB8).

When the XML document is sent by the first browser execution unit 261a, the communication unit 20b of the POS control device 11 receives the XML document (step SA6) and outputs to the printer unit control unit 20a (step SA7).

The printer unit control unit 20a generates and outputs to the printer unit 21 control commands that are control commands conforming to the command language of the printer unit 21 based on the input XML document and cause the printer unit 21 to execute the processes related to producing a receipt (step SA8). The control circuit of the printer unit 21 then controls the related mechanisms and produces a receipt based on the control commands (step SA9).

As described above, the POS system 1 according to this embodiment of the invention includes a first tablet terminal 101 (first terminal) that runs a browser, a second tablet terminal 102 (second terminal) that runs a browser, and a POS control device 11 having a communication unit 20b that communicatively connects to each of these terminals and sends data (display-related data D1) received from the browser running on the first tablet terminal 101 to the browser running on the second tablet terminal 102.

Thus comprised, data can be sent from the first tablet terminal 101 through the POS control device 11 to the second tablet terminal 102, and the second tablet terminal 102 can be controlled to execute processes based on the data. More specifically, appropriate processes can be executed in the POS system 1 using functions of the first tablet terminal 101 and the second tablet terminal 102. In this example display-related data D1 is sent from the first tablet terminal 101 to the second tablet terminal 102, and the second tablet terminal 102 executes a display process based on the data, but the content of the data the first tablet terminal 101 sends, and the content of the process the second tablet terminal 102 executes, are not limited to what is used as an example in this embodiment. More specifically, the invention can be widely applied in systems that send data from a browser on one terminal to a browser on another terminal, and perform a computing process on the other terminal based on the data.

In this embodiment, the first tablet terminal 101 generates display-related data D1 related to the images to be displayed by the touch panel 102a (display unit) of the second tablet terminal 102, and sends the display-related data D1 to the communication unit 20b of the POS control device 11. Next, the communication unit 20b of the POS control device 11 sends the display-related data D1 received from the first tablet terminal 101 to the second tablet terminal 102. Next, the second tablet terminal 102 displays the image on the touch panel 102a based on the display-related data D1 received from the communication unit 20b of the POS control device 11.

In the configuration of the invention, display-related data D1 can be sent from the first tablet terminal 101 through the POS control device 11 to the second tablet terminal 102, and the second tablet terminal 102 can be controlled to display images based on the display-related data D1. More specifically, appropriate processes can be executed in the POS system 1 using functions of the browsers of the first tablet terminal 101 and the second tablet terminal 102.

In this embodiment of the invention, a barcode scanner 12 is connected as an input device to the POS control device 11, and the communication unit 20b of the POS control device 11 sends data (input data) indicating the barcode information input from the barcode scanner 12 to the first tablet terminal 101. Next, the first tablet terminal 101 generates the display-related data D1 based on the data (input data) indicating the barcode information received from the communication unit 20b of the POS control device 11 by a function of the browser, and sends the display-related data D1 to the communication unit 20b of the POS control device 11. Next, the communication unit 20b of the POS control device 11 sends the display-related data D1 received from the first tablet terminal 101 to the second tablet terminal 102. Next, the second tablet terminal 102 displays an image on the touch panel 102a (display unit) of the second tablet terminal 102 by a function of the browser based on the display-related data D1 received from the communication unit 20b of the POS control device 11.

Thus comprised, the first tablet terminal 101 can cause the second tablet terminal 102 to display an appropriate image corresponding to input from an input device. More specifically, appropriate processes can be executed using functions of the browsers of the first tablet terminal 101 and the second tablet terminal 102.

Note that the invention is described in the above embodiment using an example in which the input data is data based on the result of reading with a barcode scanner 12 used as the input device, but data based on the result of reading by a card reader 13, which like the barcode scanner 12 is often connected to the POS control device 11, can be processed in the same way.

The invention is described above with reference to a preferred embodiment thereof, but the invention is not limited thereto and can be modified and adapted in many ways without departing from the scope of the accompanying claims.

For example, in the embodiment described above, the terminal connected to the POS control device 11 and functioning as a customer display is only the second tablet terminal 102, but plural connected terminals may be configured to function as the customer display. In this event, a virtual communication path is established with each of the plural terminals, and when display-related data D1 is received from the first tablet terminal 101, the data may be output to the respective terminals through the corresponding virtual communication paths.

Yet further, the POS control device 11 and the POS server 17 are separate devices above, but the function of the POS server 17 may be incorporated in the POS control device 11.

Yet further, the POS control device 11 is a thermal printer above, but any type of recording method may be used.

Yet further, the function blocks shown in FIG. 2 can be desirably achieved by the cooperation of hardware and software, and do not suggest a specific hardware configuration. In addition, the operations can be performed by the devices executing programs stored on an externally connected storage medium.

INDUSTRIAL APPLICABILITY

As described above, the invention is useful in a POS system that executes a payment process using terminals that display and otherwise process information through a browser, and can be applied to a printing device that is used in a POS system and prints receipts, for example.

REFERENCE SIGNS LIST

1 POS system
11 POS control device (printing device)
12 barcode scanner (input device)
13 card reader (input device)
20 POS terminal control unit
20b communication unit
21 printer unit (print unit)
30 server control unit
101 first tablet terminal (first terminal)
102 second tablet terminal (second terminal)
102a touch panel (display unit)
261 first terminal control unit (first control unit, transmission unit)
261a first browser execution unit
262 second terminal control unit(second control unit, reception unit)
262a second browser execution unit
271 terminal interface (transmission unit)
272 terminal interface (reception unit)

The invention claimed is:

1. A POS system comprising:
a first terminal having a first controller configured to run a first browser that generates first display data and second display data by a first script, a first interface configured to transmit the second display data, and a first display configured to display the first display data;
a POS server configured to transmit product information corresponding to barcode information to the first terminal when the POS server receives a request corresponding to the barcode information from the first terminal;
a printing device having a communicator configured to connect to the first interface of the first terminal and a device communicator configured to communicate with a barcode scanner; and
a second terminal having a second interface configured to connect to the communicator of the printing device, a second controller configured to run a second browser that processes the second display data received by the second interface, and a second display configured to display the second browser by a second script as a customer display, wherein
the barcode scanner is configured to scan a barcode and transmit a result of scanning to the device communicator,
the device communicator receives the result of scanning, generates the barcode information based on the result of scanning, and outputs the generated barcode information to the communicator,
the communicator receives the barcode information and transmits the barcode information to the first interface,
the first interface receives the barcode information, the first browser generates the first display data including an input field based on the barcode information, the first controller displays the first display data on the first display, the first display data rendering a user interface for a user on the first display, the first interface transmits the second display data to the communicator,
the communicator receives the second display data and transmits the second display data to the second interface,
the second interface receives the second display data,
the second controller displays the second display data on the second display, the second display data being viewable by a customer,
the second display data include data specifying a first display area of a user interface displayed on the second display and information to be displayed in the first display area,
the first interface transmits the request corresponding to the barcode information to the POS server when the first interface receives the barcode information from the communicator,
the first browser generates the first display data based on the barcode information and the product information when the first interface receives the barcode information from the communicator and the product information from the POS server, and
the printing device includes a print mechanism configured to print based on print data in an XML-compliant format transmitted from the first terminal.

2. The POS system described in claim 1, wherein the first controller displays the input data from the barcode scanner in the input field on the first display.

3. The POS system described in claim 1, wherein the printing device has a print mechanism that prints based on the data transmitted from the first interface.

4. The POS system described in claim 1, wherein the communicator is configured to receive third display data and the print data transmitted from the first terminal;
the communicator receives the third display data including an input field and the print data generated by the first terminal based on input data generated by the device communicator and transmits the third display data to the second terminal, and
the print mechanism prints the print data received by the communicator, and
the third display data include data specifying a second display area of a user interface displayed on the second display and information to be displayed in the second display area.

5. The POS system described in claim 1, wherein the POS server, in response to a request from the first terminal, sends a web page to the first terminal for the first browser, and in response to a request from the second terminal, sends a web page to the second terminal for the second browser.

* * * * *